UNITED STATES PATENT OFFICE.

PAUL POETSCHKE, OF MILFORD, KENT COUNTY, AND FRANK LAYTON GRIER, OF MILFORD, SUSSEX COUNTY, DELAWARE, ASSIGNORS TO THE L. D. CAULK CO., OF MILFORD, DELAWARE, A CORPORATION OF DELAWARE.

CEMENT-CONSISTENCY STANDARD.

1,196,582.      Specification of Letters Patent.      Patented Aug. 29, 1916.

No Drawing.      Application filed October 13, 1914. Serial No. 866,450.

*To all whom it may concern:*

Be it known that we, PAUL POETSCHKE and FRANK LAYTON GRIER, citizens of the United States, and residents, respectively, of Milford, in the county of Kent, and Milford, in the county of Sussex, State of Delaware, have made certain new and useful Improvements in Cement-Consistency Standards, of which the following is a specification.

Our invention relates to a new and useful composition of matter to be used as a consistency guide in determining the proper consistency to which a cement is to be mixed for use, such as dental cements for use in filling teeth.

A further object of our invention is to provide a method of determining the consistency of a cement mix while in the course of preparation, by comparing such a mix with said composition to be used as a consistency guide.

Other objects and advantages will appear in the following specification, and the novel features of the invention will be particularly pointed out in the appended claim.

In mixing cements whose ingredients consist of a powder and liquid, for use, especially in mixing dental cements, failures in the subsequent application of cements often result, because of the fact that the proper consistency is not obtained. It is almost impossible to convey an idea of the proper consistency to be obtained in such cement mixes, by written statements, by photographs, or even by actual demonstrations. Persons who make frequent mixes of dental cements may, by experience, learn the proper consistency, but those who do not keep in practice, are apt to forget the physical properties of the mix which should be obtained, so that the latter is either too thin or else too thick.

Our invention contemplates the provision of a cement consistency standard, which has virtually the same physical properties, when manipulated in the accustomed manner, as the cement which is to be mixed, when it arrives at its proper consistency, except that said consistency standard retains this consistency, whereas the cement mix soon sets and becomes hard.

In carrying out our invention we make use of the following ingredients in the proportions stated:

| | |
|---|---|
| Starch | 1 lb. |
| Water | 1 lb. |
| Glycerin | 8 lbs. |
| Cocoa butter | 1½ oz. |
| Sodium fluorid | 60 grains. |
| Silica or silicate powder | 33 lbs. |

The silica may consist of glass ground very fine, sand or quartz ground fine, while the silicate powder may be the same powder which is used with so-called silicate dental cements. The silicate powder may further be replaced, wholly or in part, by other mineral substances, such as zinc oxid, with or without coloring matter, so as to simulate cements of the zinc oxy-phosphate type.

It will be understood that the formula given above is for a consistency guide which is applicable to cement of given composition and that the portions of the ingredients may vary in accordance with the properties and uses of the cement mass which it is intended to simulate. Furthermore there is on the market a variety of dental cements, such as the silicate cements, zinc oxy-phosphates, oxy-sulfates, and oxy-chlorids, copper cements, etc., which are known to the dental profession. The proportions of the ingredients of the standard may vary to form a plastic composition having the consistency of any of these cements when the cement mass is at its proper consistency.

The composition which forms the cement consistency standard, has certain properties which render its use especially desirable. In the first place, the consistency of the standard is substantially constant, that is to say, it does not materially alter its physical character under ordinary conditions of exposure to the atmosphere, or to ordinary variations in temperature.

The consistency standard does not deteriorate or become rancid, owing to the presence of sodium fluorid. The composition is of granular texture, is non-volatile and non-hygroscopic as stated above. The consistency of the standard is for practical purposes constant under a considerable variation of temperature, so that whether used in a cold climate or a hot one, the composition neither tends to harden nor to soften up, It will be understood, of course, that the variation of temperature above, refers to ordinary variation of temperature which will occur in offices or laboratories, where the consistency standard is being employed, and not to extremes of heat or cold.

In using this consistency standard, an amount substantially the same as that of the actual cement mix, to be prepared, is placed upon a base such as a glass plate, and spatulated in the usual manner. The operator therefore acquaints himself with the feeling of the mass under the spatula, and its action, as far as plasticity, adhesiveness, ductility, etc., are concerned. For dental cements the powder is placed at one end of the glass slab, the liquid at the other, and portions of the powder are brought into the liquid and mixed thoroughly by spatulation. In the case of dental cements, spatulation should continue long enough to incorporate the necessary quantity of powder, but not longer, since continued spatulation will interfere with the setting properties and render the mix undesirable. One can readily tell by comparing the cement mix in question, with that of the consistency standard, the proper consistency to be obtained for the former. In view of the fact that the cement mix at the end of the spatulation should be of a certain consistency, the utility of the consistency standard is at once apparent.

The consistency standard is put up in small containers and distributed for use in conjunction with the cement mix which it is intended to simulate, so that at all times the dentist will have convenient, a standard of consistency by which he may be assured of the correct consistency to which he should bring a given cement mix.

We claim:

The herein described composition of matter consisting of starch, water, glycerin, cocoa butter, sodium fluorid, and a silicate.

PAUL POETSCHKE.
FRANK LAYTON GRIER.

Witnesses:
W. G. SAMMONS,
WM. SHOCKLEY DOUGHERTY.

Copies of this patent may be obtained for five cents each, by addressing the "Commissioner of Patents, Washington, D. C."